May 31, 1932. A. BÜCHI 1,860,769
MEANS FOR PACKING CYLINDER LINERS
Filed Sept. 24, 1930  2 Sheets-Sheet 1
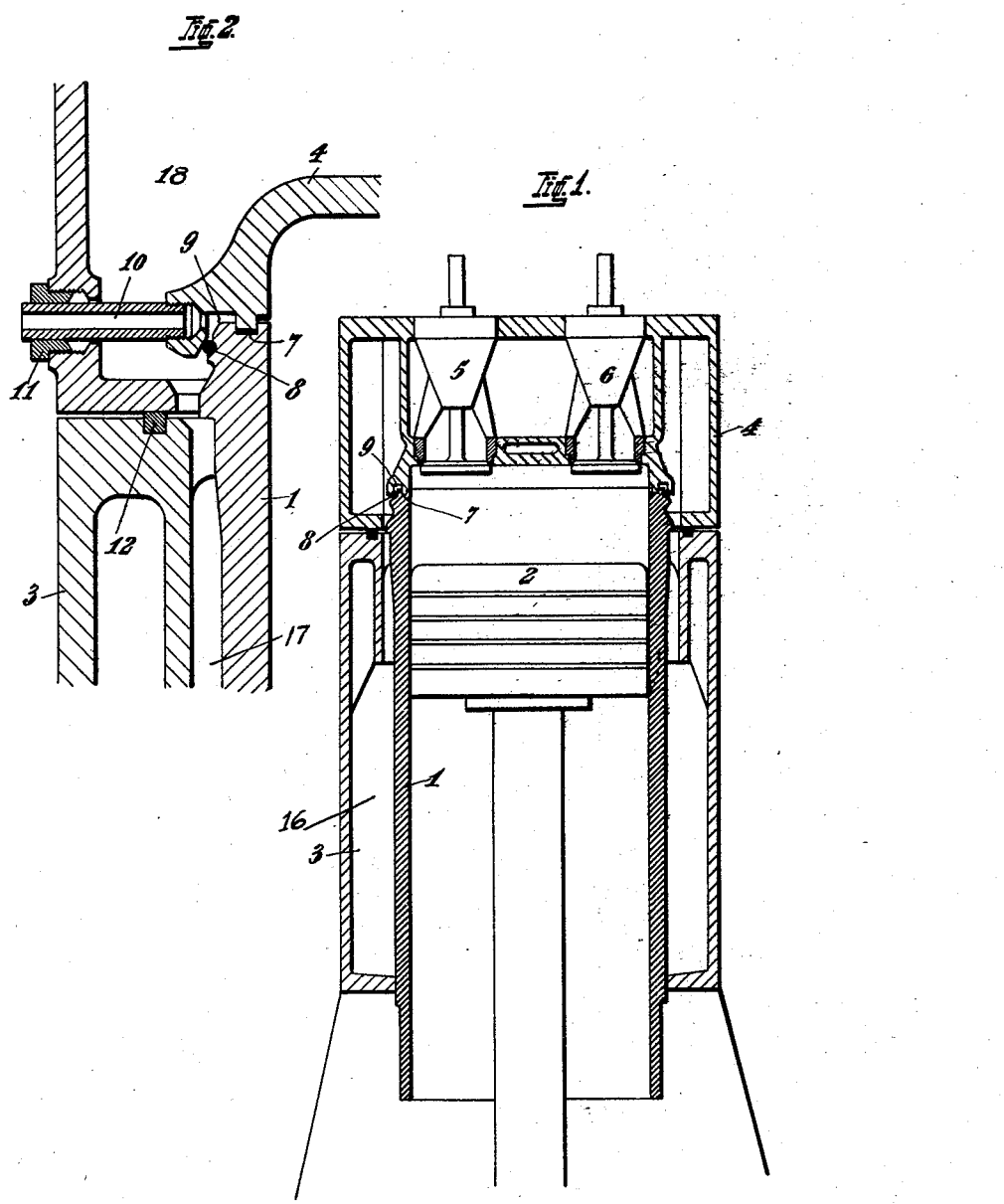

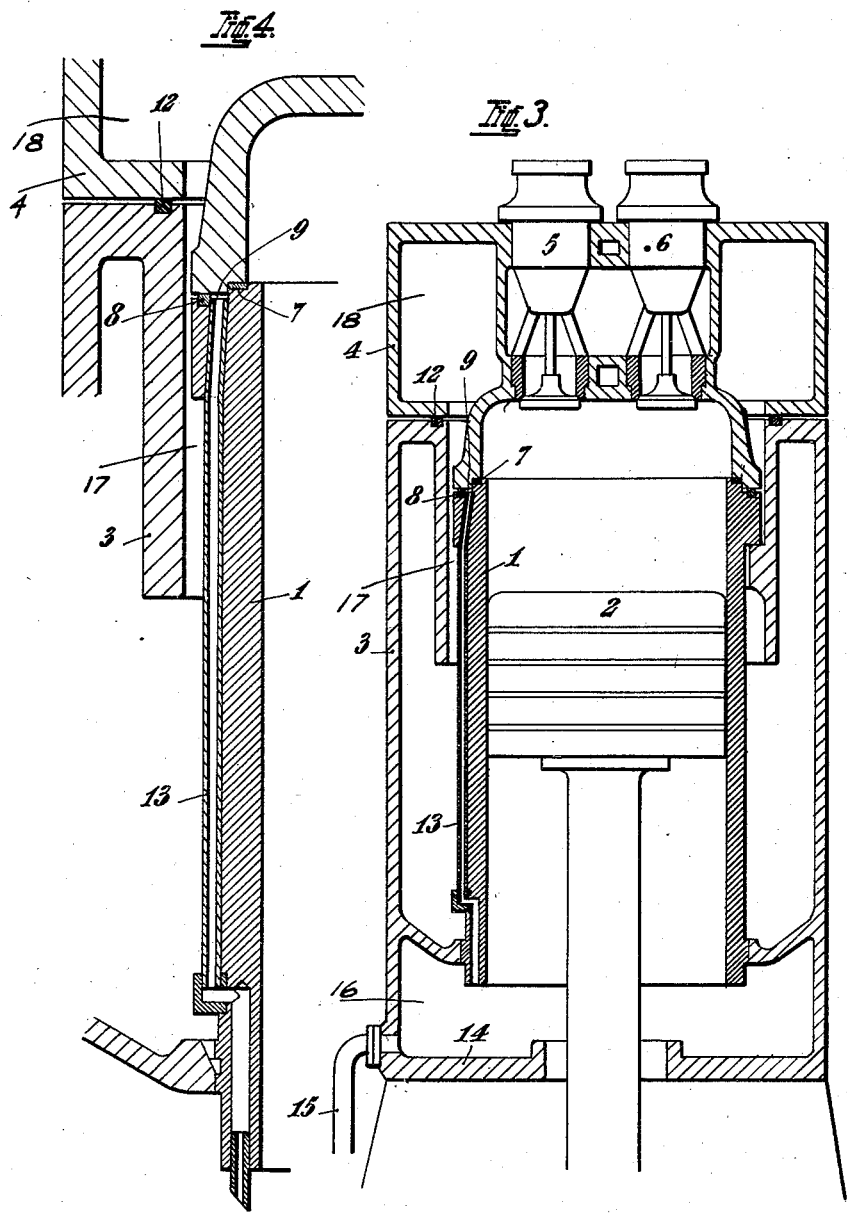

Patented May 31, 1932

1,860,769

UNITED STATES PATENT OFFICE

ALFRED BÜCHI, OF WINTERTHUR, SWITZERLAND, ASSIGNOR TO SWISS LOCOMOTIVE AND MACHINE WORKS, OF WINTERTHUR, SWITZERLAND, A CORPORATION OF SWITZERLAND

MEANS FOR PACKING CYLINDER LINERS

Application filed September 24, 1930, Serial No. 484,020, and in Switzerland September 30, 1929.

My invention relates to means for packing cylinder liners and is particularly applicable to internal combustion engines, and has for its object to provide an improved construction thereof.

According to this invention, two joint faces are arranged concentric with the longitudinal axis of the cylinder at the end face of the liner, of which joints the inner one is rigid and closes the combustion chamber, whilst the outer is yielding or resilient and closes the cooling chamber or water jacket, an annular space which is formed between the two joints being always open to the atmosphere for the purpose of completely relieving it of all pressure and emptying it of cooling fluid.

According to a feature of the invention, the side of the cooling chamber remote from the combustion chamber may likewise be closed by yielding or resilient packing.

One embodiment of the invention and a modification thereof are diagrammatically illustrated by way of example in the accompanying drawings, wherein:—

Figure 1 is a central vertical longitudinal section through a cylinder liner packed according to the invention, and Figure 2 a detail view thereof on a larger scale;

Figures 3 and 4 are like views, respectively, showing a modified arrangement.

In the drawings, 1 denotes the liner of a cylinder 3 of an internal combustion engine to be packed, 2 designates the piston, and 4 the cylinder head whereof the inner part closes the liner at one end, valves 5 and 6 being provided in the head 4.

According to the invention, an inner packing member 7 and an outer packing member 8 are arranged at the abutting faces between the head 4 and the liner 1. The inner packing member 7 is a hard, e. g. metallic, member, whilst the outer packing member is yielding or elastic and composed of rubber, or the like. Between these two joints 7, 8 is an annular space 9 connected to a space 16 which is always open to the atmosphere, so that atmospheric pressure is present in it and any gas or cooling medium that may enter into it can flow away.

In the construction shown in Figures 1 and 2 such evacuation of the space 9 occurs through a tube 10 which is screwed horizontally into position just above the lower face of the cylinder head 4 and extends freely through a stuffing box 11 in the outer wall of the cylinder head.

Besides the two joints 7 and 8 a third joint 12 is arranged between the cylinder body 3 and the cylinder head 4, which packing member 12 shuts off from the open air the cooling medium in the jacketing spaces 17 and 18. This packing member 12 is likewise preferably yielding or elastic.

In the construction shown in Figures 3 and 4, the annular space 9 is connected to the atmosphere and drained by a downwardly directed tube 13 extending along the periphery of the liner. This tube 13 opens into a lower part 16' of the cylinder body which is connected to the atmosphere by a tube 15. In this construction also there is a third elastic packing member 12 between the cylinder body 3 and its head 4, which joint 12 prevents the cooling medium from leaking into the atmosphere.

I claim:—

1. In combination, a cylinder head, a cylinder liner, two concentric joints between said cylinder head and said liner, a rigid packing provided on the inner joint, a yielding packing provided on the outer joint, an annular space between said two joints, and a conduit from said annular space to a space with atmospheric pressure.

2. In combination, a cylinder head, a cylinder jacket, two concentric joints between said cylinder head and said liner, a rigid packing provided on the inner joint, a yielding packing provided on the outer joint, an annular space between said two joints, a conduit from said annular space to a space with atmospheric pressure, a cooling chamber between said liner and said cylinder jacket, and a third joint provided with a yielding packing.

3. In combination, a cylinder head, a cylinder liner, two concentric joints between said cylinder head and said liner, a rigid packing provided on the inner joint, a yielding packing provided on the outer joint, an annular space between said two joints, and a conduit connecting said annular space with a space having substantially atmospheric pressure, said conduit extending alongside said cylinder liner.

In testimony whereof I affix my signature.

ALFRED BÜCHI.